US011869163B1

United States Patent
Liang et al.

(10) Patent No.: US 11,869,163 B1
(45) Date of Patent: Jan. 9, 2024

(54) VIRTUAL GARMENT DRAPING USING MACHINE LEARNING

(71) Applicant: Amazon Technologies, Inc., Seattle, WA (US)

(72) Inventors: Junbang Liang, Seattle, WA (US); Ming Lin, Greenbelt, MD (US); Javier Romero Gonzalez-Nicolas, Barcelona (ES); Adam Douglas Peck, Seattle, WA (US); Chetan Shivarudrappa, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 85 days.

(21) Appl. No.: 17/478,655

(22) Filed: Sep. 17, 2021

(51) Int. Cl.
  *G06T 19/20* (2011.01)
  *G06N 3/088* (2023.01)
  *G06F 30/27* (2020.01)
  *G06F 113/12* (2020.01)
  *G06V 10/40* (2022.01)
  *G06F 18/214* (2023.01)
  *G06N 3/045* (2023.01)

(52) U.S. Cl.
  CPC ............ *G06T 19/20* (2013.01); *G06F 18/214* (2023.01); *G06F 30/27* (2020.01); *G06N 3/045* (2023.01); *G06N 3/088* (2013.01); *G06V 10/40* (2022.01); *G06F 2113/12* (2020.01); *G06T 2200/24* (2013.01); *G06T 2219/2004* (2013.01); *G06T 2219/2021* (2013.01)

(58) Field of Classification Search
  None
  See application file for complete search history.

(56) References Cited

U.S. PATENT DOCUMENTS

| 9,189,886 B2 | 11/2015 | Black et al. |
| 10,395,411 B2 | 8/2019 | Black et al. |
| 11,112,772 B2 | 9/2021 | Choche et al. |

(Continued)

FOREIGN PATENT DOCUMENTS

| WO | WO 2020/263701 | 12/2020 |
| WO | WO 2020/263705 | 12/2020 |

OTHER PUBLICATIONS

Dressing 3D Humans using a Conditional Mesh-VAE-GAN (Year: 2014).*

(Continued)

*Primary Examiner* — Kyle Zhai
(74) *Attorney, Agent, or Firm* — Knobbe, Martens, Olson & Bear, LLP

(57) ABSTRACT

Systems and methods are provided for machine learning-based rendering of a clothed human with a realistic 3D appearance by virtually draping one or more garments or items of clothing on a 3D human body model. The machine learning model may be trained to drape a garment on a 3D body mesh using training data that includes a variety 3D body meshes reflecting a variety of different body types. The machine learning model may include an encoder trained to extract body features from an input 3D mesh, and a decoder network trained to drape the garment on the input 3D mesh based at least in part on spectral decomposition of a mesh associated with the garment. The trained machine learning model may then be used to drape the garment or a variation of the garment on a new input body mesh.

17 Claims, 8 Drawing Sheets

(56) References Cited

U.S. PATENT DOCUMENTS

| | | | |
|---|---|---|---|
| 11,461,819 | B2 | 10/2022 | Choche et al. |
| 11,559,098 | B2 | 1/2023 | Choche et al. |
| 2020/0397080 | A1 | 12/2020 | Choche et al. |
| 2020/0401114 | A1 | 12/2020 | Choche et al. |
| 2020/0402126 | A1 | 12/2020 | Choche et al. |
| 2022/0368882 | A1* | 11/2022 | Tiwari ............. G06T 7/75 |

OTHER PUBLICATIONS

Learning an Intrinsic Garment Space for Interactive Authoring of Garment Animation, ACM (Year: 2019).*
Learning Spectral Descriptors for Deformable Shape Correspondence, IEEE (Year: 2014).*
DRAPE: Dressing Any Person, ACM (Year: 2012).*
Age and body mass index-related changes in cutaneous shear wave velocity, Elsevier (Year: 2001).*
David Baraff and Andrew Witkin. Large steps in cloth simulation. In SIGGRAPH, 1998.
Hugo Bertiche, Meysam Madadi, and Sergio Escalera. Pbns: Physically based neural simulator for unsupervised garment pose space deformation. arXiv preprint arXiv:2012.11310, 2020.
Hugo Bertiche, Meysam Madadi, Emilio Tylson, and Sergio Escalera. DeePSD: Automatic deep skinning and pose space deformation for 3D garment animation. arXiv preprint arXiv:2009.02715, 2020.
Bharat Lal Bhatnagar, Garvita Tiwari, Christian Theobalt, and Gerard Pons-Moll. Multi-garment net: Learning to dress 3D people from images. In Proceedings of the IEEE International Conference on Computer Vision, pp. 5420-5430, 2019.
Enric Corona, Albert Pumarola, Guillem Alenyà, Gerard Pons-Moll, and Francesc Moreno-Noguer. SMPLicit: Topology-aware generative model for clothed people. In CVPR, 2021.
Edilson De Aguiar, Leonid Sigal, Adrien Treuille, and Jessica K Hodgins. Stable spaces for real-time clothing. ACM Transactions on Graphics (TOG), 29(4):1-9, 2010.
Russell Gillette, Craig Peters, Nicholas Vining, Essex Edwards, and Alla Sheffer. Real-time dynamic wrinkling of coarse animated cloth. In Proceedings of the 14th ACM SIGGRAPH/Eurographics Symposium on Computer Animation, pp. 17-26, 2015.
Rony Goldenthal, David Harmon, Raanan Fattal, Michel Bercovier, and Eitan Grinspun. Efficient simulation of inextensible cloth. In ACM SIGGRAPH 2007 papers, pp. 49-es. 2007.
Erhan Gundogdu, Victor Constantin, Amrollah Seifoddini, Minh Dang, Mathieu Salzmann, and Pascal 425 Fua. Garnet: A two-stream network for fast and accurate 3D cloth draping. In Proceedings of the IEEE International Conference on Computer Vision, pp. 8739-8748, 2019.
Fabian Hahn, Bernhard Thomaszewski, Stelian Coros, Robert W Sumner, Forrester Cole, Mark Meyer, Tony DeRose, and Markus Gross. Subspace clothing simulation using adaptive bases. ACM Transactions on Graphics (TOG), 33(4):1-9, 2014.
Xintong Han, Zuxuan Wu, Zhe Wu, Ruichi Yu, and Larry S Davis. Viton: An image-based virtual try-on network. In Proceedings of the IEEE conference on computer vision and pattern recognition, pp. 7543-7552, 2018.
Daniel Holden, Bang Chi Duong, Sayantan Datta, and Derek Nowrouzezahrai. Subspace neural physics: Fast data-driven interactive simulation. In Proceedings of the 18th annual ACM SIGGRAPH/Eurographics Symposium on Computer Animation, pp. 1-12, 2019.
Ning Jin, Yilin Zhu, Zhenglin Geng, and Ronald Fedkiw. A pixel-based framework for data-driven clothing. In Computer Graphics Forum, vol. 39, pp. 135-144. Wiley Online Library, 2020.
Doyub Kim, Woojong Koh, Rahul Narain, Kayvon Fatahalian, Adrien Treuille, and James F O'Brien. Near-exhaustive precomputation of secondary cloth effects. ACM Transactions on Graphics (TOG), 32(4): 1-8, 2013.
Thomas N Kipf and Max Welling. Semi-supervised classification with graph convolutional networks. arXiv preprint arXiv:1609.02907, 2016.
Zorah Lahner, Daniel Cremers, and Tony Tung. Deepwrinkles: Accurate and realistic clothing modeling. In Proceedings of the European Conference on Computer Vision (ECCV), pp. 667-684, 2018.
Junbang Liang andMing C Lin. Time-domain parallelization for accelerating cloth simulation. In Computer Graphics Forum, vol. 37, pp. 21-34. Wiley Online Library, 2018.
Tiantian Liu, Adam W Bargteil, James F O'Brien, and Ladislav Kavan. Fast simulation of mass-spring systems. ACM Transactions on Graphics (TOG), 32(6):1-7, 2013.
Matthew Loper, Naureen Mahmood, Javier Romero, Gerard Pons-Moll, and Michael J Black. SMPL: A skinned multi-person linear model. ACM transactions on graphics (TOG), 34(6):1-16, 2015.
Qianli Ma, Jinlong Yang, Anurag Ranjan, Sergi Pujades, Gerard Pons-Moll, Siyu Tang, and Michael J Black. Learning to dress 3D people in generative clothing. In Proceedings of the IEEE/CVF Conference on Computer Vision and Pattern Recognition, pp. 6469-6478, 2020.
Qianli Ma, Shunsuke Saito, Jinlong Yang, Siyu Tang, and Michael J Black. Scale: Modeling clothed humans with a surface codec of articulated local elements. arXiv preprint arXiv:2104.07660, 2021.
Victor J Milenkovic and Harald Schmidl. Optimization-based animation. In Proceedings of the 28th annual conference on Computer graphics and interactive techniques, pp. 37-46, 2001.
Rahul Narain, Armin Samii, and James F. O'Brien. Adaptive anisotropic remeshing for cloth simulation. ACM Trans. Graph., 31(6), 2012.
Assaf Neuberger, Eran Borenstein, Bar Hilleli, Eduard Oks, and Sharon Alpert. Image based virtual try-on network from unpaired data. In Proceedings of the IEEE/CVF Conference on Computer Vision and Pattern Recognition, pp. 5184-5193, 2020.
Xiang Ni, Laxmikant V Kale, and Rasmus Tamstorf. Scalable asynchronous contact mechanics using charm++. In Parallel and Distributed Processing Symposium (IPDPS), 2015 IEEE International, pp. 467 677-686. IEEE, 2015.
Chaitanya Patel, Zhouyingcheng Liao, and Gerard Pons-Moll. TailorNet: Predicting clothing in 3D as a function of human pose, shape and garment style. In IEEE Conference on Computer Vision and Pattern Recognition (CVPR). IEEE, Jun. 2020.
Charles R Qi, Hao Su, Kaichun Mo, and Leonidas J Guibas. Pointnet: Deep learning on point sets for 3D classification and segmentation. In Proceedings of the IEEE conference on computer vision and pattern recognition, pp. 652-660, 2017.
Kathleen M Robinette, Sherri Blackwell, Hein Daanen, Mark Boehmer, and Scott Fleming. Civilian American and European surface anthropometry resource (Caesar), final report. vol. 1. summary. Technical report, Sytronics Inc Dayton OH, 2002.
Igor Santesteban, Miguel A. Otaduy, and Dan Casas. Learning-Based Animation of Clothing for Virtual Try-On. Computer Graphics Forum (Proc. Eurographics), 2019. ISSN 1467-8659. doi:10.1111/cgf.13643.
Igor Santesteban, Nils Thuerey, Miguel A Otaduy, and Dan Casas. Self-Supervised Collision Handling via Generative 3D Garment Models for Virtual Try-On. IEEE/CVF Conference on Computer Vision and Pattern Recognition (CVPR), 2021.
Yu Shen, Junbang Liang, and Ming C Lin. Gan-based garment generation using sewing pattern images. In Proceedings of the European Conference on Computer Vision (ECCV), vol. 1, p. 3, 2020.
Rasmus Tamstorf, Toby Jones, and Stephen F McCormick. Smoothed aggregation multigrid for cloth simulation. ACM Transactions on Graphics (TOG), 34(6):1-13, 2015.
Min Tang, Tongtong Wang, Zhongyuan Liu, Ruofeng Tong, and Dinesh Manocha. I-cloth: incremental collision handling for GPU-based interactive cloth simulation. ACM Transactions on Graphics (TOG), 37(6):1-10, 2018.
Petar Velickovic, Guillem Cucurull, Arantxa Casanova, Adriana Romero, Pietro Lio, and Yoshua Bengio. Graph attention networks. arXiv preprint arXiv:1710.10903, 2017.
Raquel Vidaurre, Igor Santesteban, Elena Garces, and Dan Casas. Fully Convolutional Graph Neural Networks for Parametric Virtual Try-On. Computer Graphics Forum (Proc. SCA), 2020.

(56) References Cited

OTHER PUBLICATIONS

Huamin Wang and Yin Yang. Descent methods for elastic body simulation on the GPU. ACM Transactions on Graphics (TOG), 35(6):1-10, 2016.

Huamin Wang, Florian Hecht, Ravi Ramamoorthi, and James F O'Brien. Example-based wrinkle synthesis for clothing animation. In ACM SIGGRAPH 2010 papers, pp. 1-8, 2010.

Tuanfeng Y Wang, Duygu Ceylan, Jovan Popovic, and Niloy J Mitra. Learning a shared shape space for multimodal garment design. arXiv preprint arXiv:1806.11335, 2018.

Tuanfeng Y 501 Wang, Tianjia Shao, Kai Fu, and Niloy J Mitra. Learning an intrinsic garment space for interactive authoring of garment animation. ACM Transactions on Graphics (TOG), 38(6):1-12, 2019.

Nicholas J Weidner, Kyle Piddington, David IW Levin, and Shinjiro Sueda. Eulerian-on-Lagrangian cloth simulation. ACM Transactions on Graphics (TOG), 37(4):1-11, 2018.

Jinlong Yang, Jean-Sébastien Franco, Franck Hétroy-Wheeler, and Stefanie Wuhrer. Analyzing clothing layer deformation statistics of 3D human motions. In Proceedings of the European Conference on Computer Vision (ECCV), pp. 237-253, 2018.

Shan Yang, Junbang Liang, and Ming C Lin. Learning-based cloth material recovery from video. In Proceedings of the IEEE International Conference on Computer Vision, pp. 4383-4393, 2017.

Ilya Zakharkin, Kirill Mazur, Artur Grigorev, and Victor Lempitsky. Point-based modeling of human clothing. arXiv preprint arXiv:2104.08230, 2021.

Hao Zhang, Oliver Van Kaick, and Ramsay Dyer. Spectral mesh processing. In Computer graphics forum, vol. 29, pp. 1865-1894. Wiley Online Library, 2010.

Meng Zhang, Tuanfeng Wang, Duygu Ceylan, and Niloy Mitra. Deep detail enhancement for any garment. arXiv e-prints, pages arXiv-2008, 2020.

* cited by examiner

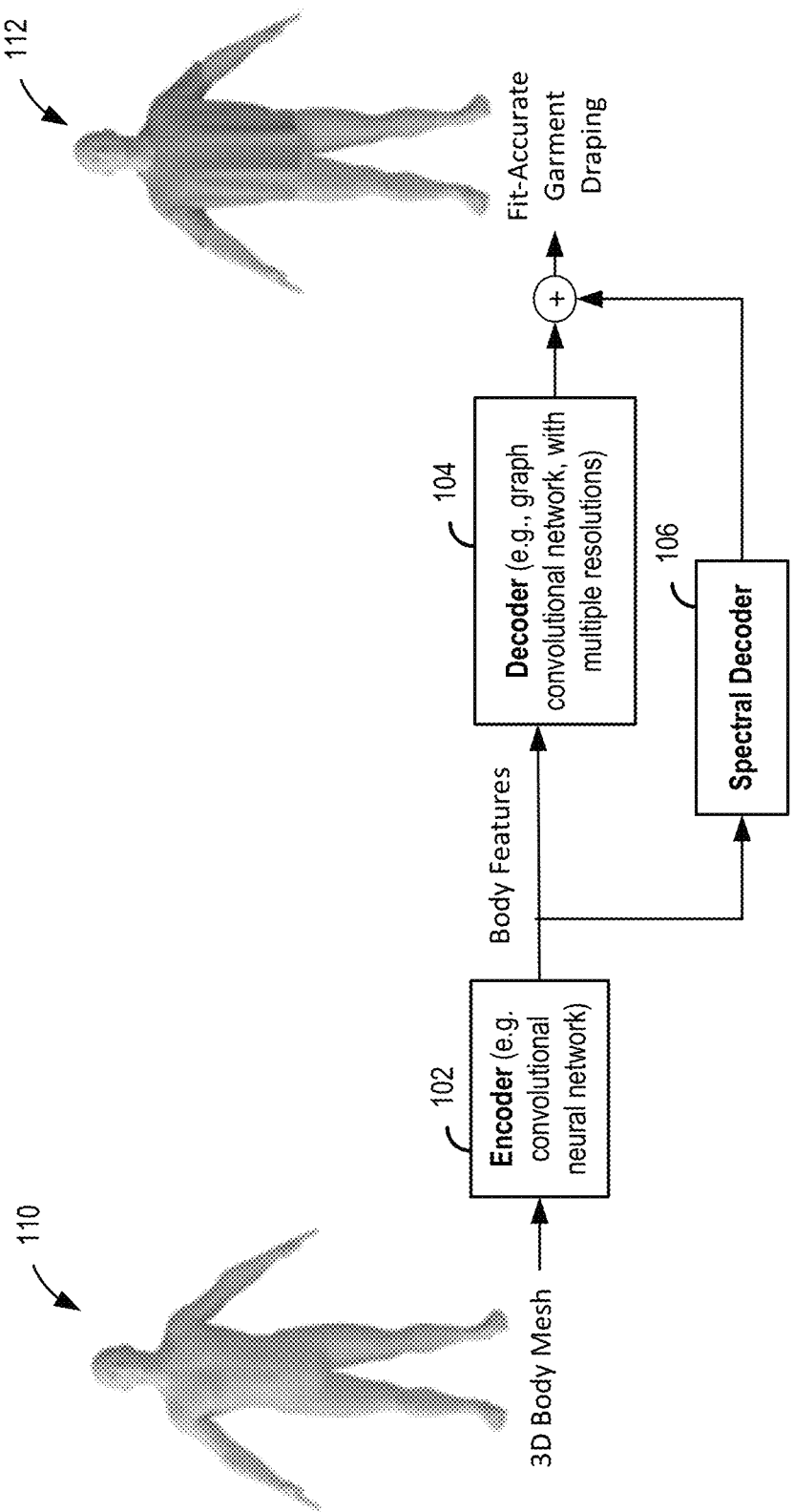

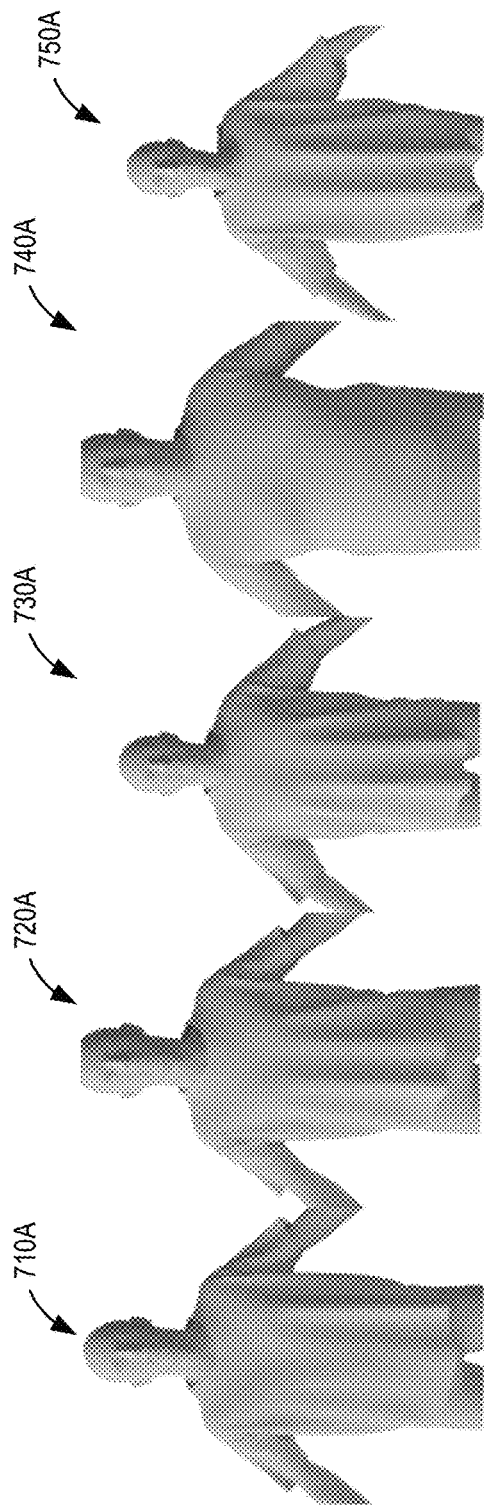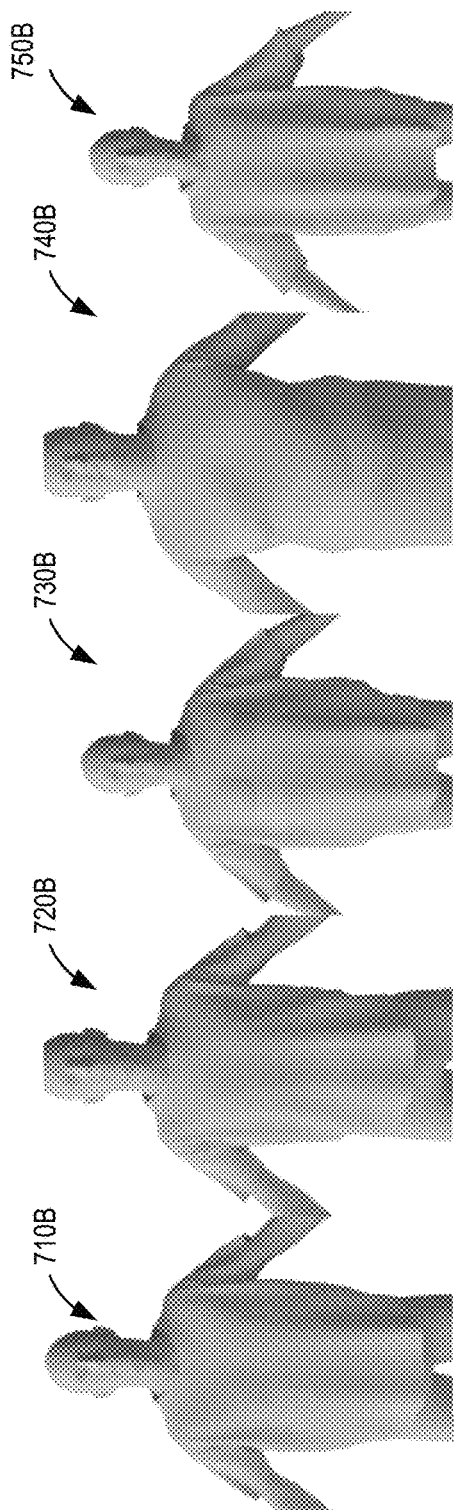
FIG. 7

VIRTUAL GARMENT DRAPING USING MACHINE LEARNING

BACKGROUND

A number of different computer-implemented approaches have been used or proposed for rendering three-dimensional ("3D") representations of items of clothing worn by or draped over a 3D human model. For example, there is often a need in fields such as 3D computer animation to generate a 3D rendering of particularly items of clothing or an entire outfit as worn by a particular 3D character or model in a manner that appears physically realistic with respect to the clothes' tightness on the particular body, the appearance of wrinkles, the manner in which loose material hangs or falls from particular parts of the body, etc. Typically, the most realistic results for garment or clothing draping have been generated using physics-based cloth simulation techniques that are computationally expensive and slow to complete. For example, according to some such simulation techniques, rendering a single item of clothing on a single body model could require over thirty minutes of computing time, which may be prohibitively slow for certain desired uses, such as when there is a need for significantly faster dynamic rendering in response to user requests.

BRIEF DESCRIPTION OF DRAWINGS

Embodiments of various inventive features will now be described with reference to the following drawings. The drawings are provided to illustrate example embodiments described herein and are not intended to limit the scope of the disclosure.

FIG. 1 illustrates an example network architecture and data flow for fit-accurate garment draping using a learning-based approach, according to some embodiments.

FIG. 7 illustrates a comparison of sample output from the machine learning framework described herein, according to some embodiments, with sample output of a previously implemented neural network model.

DETAILED DESCRIPTION

Figure 2A:
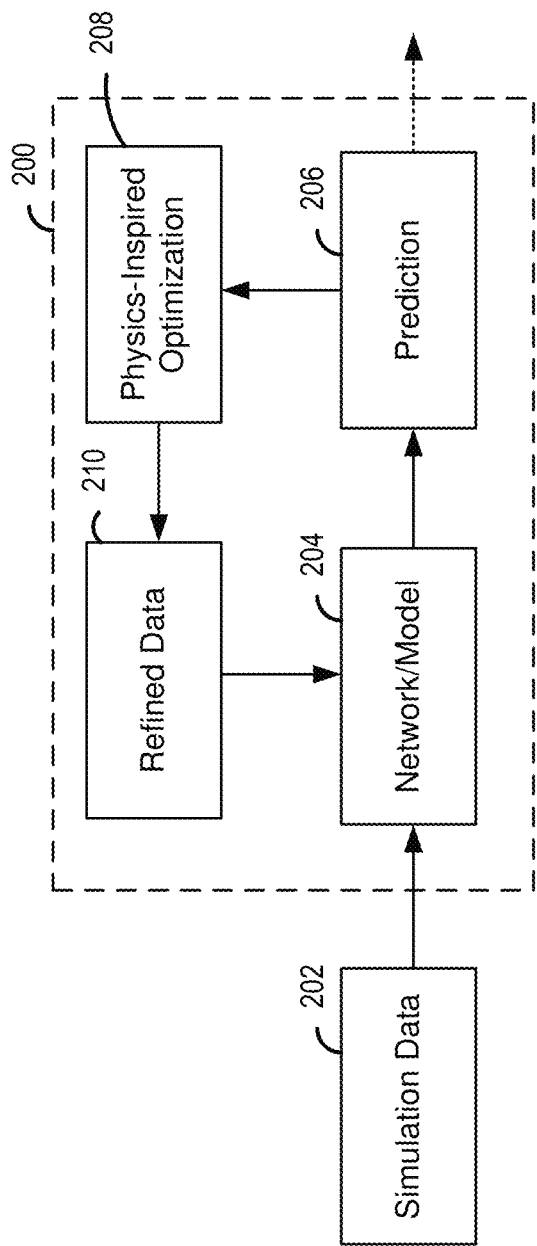
FIG. 2A depicts an illustrative data flow for a semi-supervised training or learning process that may be employed in some embodiments.

Generally described, aspects of the present disclosure relate to machine learning-based approaches to virtually rendering an image of a clothed human with a realistic 3D appearance of the clothing by virtually draping the clothing garment on a virtually rendered human figure. Aspects disclosed herein include a machine learning framework for garment draping prediction that can incorporate arbitrary loss functions at runtime. Additional features that may be implemented in some embodiments and that further distinguish aspects of the present disclosure from existing approaches to garment draping including addressing inconsistencies that may arise from the enforcement of physical constraints, such as wrinkle dynamics and material properties (including heterogeneous material properties). The disclosed methods enable garment draping that is able to fit any of a wide range of body shapes.

Aspects of the present disclosure include a semi-supervised learning framework composed of three components, in some embodiments—(1) a physics inspired supervision on a neural network, (2) an unsupervised process coupled to the physics of individual garments at runtime, and (3) self-correction of the network based on samples that are optimized in the previous unsupervised stage. The resulting system and framework is able to reproduce wrinkles and folds more accurately than previous approaches across a wide spectrum of body shapes, while executing significantly faster than traditional cloth simulation methods and with significantly reduced training data sizes relative to existing machine learning-based approaches.

Learning based cloth or clothing draping is an important component in virtual try-on systems, such as systems that enable a user to see a preview or rendering of how a particular clothing garment or outfit would fit on a virtual avatar or virtual body resembling the user's actual body. With the help of a well-trained draping network, virtual try-on systems can predict quickly and accurately how garments look and fit on a body. Alternatives like cloth simulation typically are prohibitively slow for such on-demand visualizations, while image based try-on methods (such as showing an image of clothing item over a photograph of the user captured from a camera) typically do not provide fit accurate information. While virtual try-on for clothing is one use for the systems and methods described herein, accurate and fast virtual cloth draping has uses in many other applications. For example, fast garment draping may also be a key component in interactive character prototyping for a wide range of applications, such as teleconferencing, computer animations, special effects and computer games.

There are a number of challenges in implementing an effective and efficient interactive garment try-on system (such as a system that enables a user to visually preview how a garment will look when worn by the user or a body closely resembling the user's body). First, machine learning models tend to produce overly smoothed results when using per vertex distances as their main loss. Although previous works have attempted to address this issue, they are typically limited to a narrow set of shapes (such as a limited set of predefined bodies). Next, while garments are often composed of different materials (e.g. the frontal graphic print on T shirts will tend to be stiffer than the portion of the T-shirt without a graphic), existing works typically model a single material because it is impractical to consider all combinations of different graphic print shapes at training time. Additionally, ideally the draped garments predicted by a network model should be fit accurate, but the most common losses in related work (e.g., per vertex geometry errors) do not necessarily entail fit accuracy. This often translates in prior systems into over smoothness in the shape of the garment and violation of its material properties.

Aspects of the present disclosure include a novel semi-supervised framework to address all issues above, according to some embodiments. One aspect of the implementation described herein is based on a finding that physical constraints can be reformulated as geometric loss functions that can be optimized during training. However, using the exact physical loss functions from scratch does not result in desirable draping due to their complexity. Therefore, the model described herein may first be trained with supervised, physics inspired loss functions, and then the model output may be optimized individually for each sample to conserve the actual physical energy and minimize (or even eliminate) geometric intersections. Given their superior quality compared to the initial predictions, the resulting optimized samples can then be re used to further improve the initial feed forward network.

Features of the present disclosure, according to some embodiments, include, among others: (a) a novel encoder/decoder network that effectively captures global and local features from provided input and dynamically aggregates neighborhood information; (b) introduction of novel loss functions that encode geometric, physical, material, design, and/or tailoring constraints; and (c) a semi supervised framework that enables integration of constraints into the model (such as a deep learning model).

Previous attempts at creating drape prediction systems have tended to focus on either physics based cloth simulation or learning-based garment generation. Physics based garment simulation systems usually include spatial discretization and different forms of simulations. Although several techniques have been proposed to speed up cloth simulation, including GPU acceleration and spatial and temporal parallelization, these systems have not been able to approach real time, physically accurate cloth dynamics for any given human shape.

As a faster alternative to simulation, learning based approaches have been developed for draping garments, including normal map generation, KNN body garment fusion, displacement regression, and least square approximation, among others. However, these works each tend to be limited in at least one respect, such as not providing geometric details, not generalizing to a wide range of body shapes, requiring user knowledge of wrinkle formation, and/or not being suitable for loose-fitting clothing (e.g., wrinkle dynamics may be easier to approximate in a fairly realistic manner with tighter fitting garments). In contrast, methods described herein are capable of taking only a human body mesh as input and directly regressing a garment mesh as output with realistic geometric details. Additionally, in contrast to prior methods, methods described herein according to some embodiments may utilize an exhaustive set of loss functions inspired by physics and material constraints, including the minimization of differences in the spectral domain.

In some embodiments, a parametric human body mesh is provided to a model as input, where the model is trained not only to predict the fit accurate draping of a garment on the body but also adapts to new target distributions (such as different graphic designs and/or materials on portions of the garment) quickly. The input distribution may be a wide range of human body sizes, rather than different poses. For example, in providing a fit accurate virtual try-on system for clothes, a user typically prefers an accurate garment fitting for their shape in a single pose, rather than animation of the body in moving in different poses (which would typically reduce realism and accuracy of the fit). In some embodiments, a deformable human body model, such as the Skinned Multi-Person Linear ("SMPL") model, may be used to generate a set of bodies of varied body shapes. For example, the set of bodies may follow a uniform distribution of BMIs between 10 and 65. In some embodiments, the bodies generated may have the same pose as each other, such as a neutral pose of a person standing still. Traditional cloth simulation draping may be applied to the 3D mesh models from the SMPL output to create the ground truth for training, where these cloth simulation methods may be very slow relative to the ultimate trained model's speed in draping (e.g., hundreds of times slower, in some embodiments).

As noted above, in some embodiments, the 3D mesh-based human body models for generating training data may employ the known Skinned Multi-Person Linear (SMPL) model. The SMPL model is a skinned vertex-based model that accurately represents a wide variety of 3D human body shapes in natural human poses, which deform naturally with pose and exhibit soft-tissue motions like those of real humans. The parameters of the model are learned from data including a rest pose template, blend weights, pose-dependent blend shapes, identity-dependent blend shapes, and a regressor from vertices to joint locations. The SMPL model enables training its entire model from aligned 3D meshes of different people in different poses. Because the SMPL model is based on blend skinning, the model is compatible with many rendering engines. More information regarding implementation of an SMPL model can be found in U.S. Pat. No. 10,395,411 (hereinafter "the '411 patent"), to Black et al., issued Aug. 27, 2019, entitled "SKINNED MULTI-PERSON LINEAR MODEL," which is incorporated herein by reference.

As described in the '411 patent, using the SMPL model to generate a 3D human body model in a given instance may generally include, in one embodiment, obtaining a shape-specific template of a body model defined by a number of vertices (where the shape-specific template may have been generated by applying a shape-specific blend shape to vertices of a template shape), applying a pose-dependent blend shape to the vertices of the shape-specific template (e.g., displacing the vertices of the shape-specific template into a pose- and shape-specific template of the body model), and then generating a 3D model articulating a pose of the body model based on the vertices of the pose- and shape-specific template of the body model. Thus, an SMPL-based model may be configured to receive input that includes a vector of shape parameters and a vector of pose parameters, which the SMPL model then applies with respect to a template 3D human model in order to generate a 3D human model that maps the shape and pose parameters to vertices.

While example garment types will be used below in various example instances, it will be appreciated that the machine learning models and framework described herein can be trained to drape any of a wide variety of garments, accessories, or other clothing items than those specifically mentioned herein. As non-limiting examples, the disclosed systems and methods may be trained to render realistic images of a human body or portion of a human body wearing specific shirts, pants, dresses, skirts, sweaters, sweatshirts, tight-fitting clothing items, loose-fitting clothing items, headwear, scarves, suits, swimwear, and/or others, in some embodiments.

FIG. 1 illustrates an example network architecture and data flow for fit-accurate garment draping using a learning-based approach, according to some embodiments. A single computing system may implement or include each of the illustrated components of FIG. 1, in some embodiments. In other embodiments, one computing system may implement certain aspects or components (such as obtaining or producing input data or training data, encoding body features, and/or other aspects), while another computing system implements other features (such as the decoder 104, spectral decoder 106, and/or later 3D rendering features). For ease of description, illustrative methods will be described below with respect to embodiments in which the various illustrated components are implemented by a single computing system, such as computing system 502, but this is not intended to be limiting. It will further be appreciated that references herein to a model, such as a machine learning model, may interchangeably refer to discrete components of FIG. 1 (such as the encoder or decoder individually), multiple illustrated components collectively or the framework as a whole (for example, the encoder and decoder may be considered different layers or components of a single machine learning model or framework, in some instances).

As discussed above and will be further described below, the input 3D body mesh 110 may be generated or obtained in a variety of manners, such as using an SMPL model. A 3D garment mesh for the garment to be draped (not separately illustrated in FIG. 1) may be provided as an additional input to the model or otherwise available to the model (such as by being incorporated into the training process, where the model is trained specifically for a single garment). The encoder 102, which will be further described below and may be implemented as a neural network (such as a one-dimensional convolutional neural network (CNN)), may generally be responsible for extracting body features from the 3D body mesh 110 to be provided as input to the decoder 104 and spectral decoder 106. The decoder 104, in some embodiments, may be a graph convolutional network (GCN) or other deep learning model trained to receive the body features and pass them through multiple layers configured to handle different resolutions (such as four resolutions, in one embodiment). The spectral decoder 106, which may be implemented as a multilayer perceptron (MLP) or other neural network in some embodiments, may be responsible for preservation of high frequency content of a garment by inspecting the spectral components of the garment mesh (such as by predicting the garment residuals in the spectral domain in order to improve the appearance of high frequency wrinkles in the garment). The output of the spectral decoder 106 and decoder 104 may be combined to output a fit-accurate garment draping of a virtual human body (defined by the input body mesh 110) wearing a particular garment that the model was trained to drape, such as shown in 3D rendering 112.

As an example, particular embodiments of the architecture and data flow of FIG. 1 will now be described in greater detail. Some differences between the disclosed architecture and methods of FIG. 1 compared to previous efforts of learning-based approaches to garment draping include, among other differences, that (a) the disclosed system may, in some embodiments, use a GCN decoder to better express the spatial relationship between vertices, and (b) the disclosed system may use novel losses to guide the model to correctly learn the wrinkles and folds under different circumstances for different body sizes. These and other features enable the model to significantly outperform previous works in many respects, including with respect to the realism and variety of results for a wide range of different body sizes and/or types (e.g., bodies of different genders, different heights and weights, etc.).

As discussed above, the encoder 102 may be implemented as a convolutional neural network, such as a one-dimensional convolutional neural network. In experiments, it was found that a one-dimensional convolutional neural network outperformed a GCN, for example, when the input mesh is generated using the SMPL model. In such embodiments, a CNN helps to exploit the fixed topology of the input SMPL vertices of the 3D body mesh 110. Further, implementing the encoder 102 as a CNN operating on the input SMPL vertex order is a computationally efficient approach that captures most SMPL neighborhoods (for example, in one experiment using SMPL input meshes, for over 90% of the SMPL vertices, their adjacent indexed neighbors are adjacent in topology). However, it will be appreciated that a GCN or other machine learning model type may be employed in other embodiments, and may be better suited to input body meshes obtained in manners other than employing an SMPL model.

In some embodiments, implementing the decoder 104 as a graph convolutional network (GCN) may be well-suited to capturing local relations between the garment vertex neighborhoods of an SMPL body model. A common graph convolutional layer may be defined as $y=f_\theta(Ax)$, where A is the aggregation matrix that collects and processes the information in the neighborhood in an isotropic way, and $f_\theta$ is the nonlinear activation function for feature extraction. The expressiveness of such a network may be limited since the constant aggregation matrix cannot adapt its neighbor aggregation weights. An attention-based GCN is one way to attempt to address this issue, such as using an MLP to estimate the aggregation parameters given the vertex features:

$$y=f_{\theta_1}(A_{\theta_2}x) \quad A_{\theta_2}[i,j]=\text{MLP}(x_i,x_j) \quad (1)$$

However, improved results may be seen by learning the aggregation parameters independently per vertex, without an explicit dependence on the features, such as:

$$A_{\theta_2}[i,j]=\theta_2[i,j] \quad (2)$$

In some embodiments, a further particularity of the decoder 104 is its hierarchical nature. Analogous to up-scaling in two-dimensional (2D) image generation, feeding the encoded features to a coarsened mesh helps to distribute global features to broader regions of the garment. To linearly upsample the features, the system may use the barycentric weights of the corresponding higher resolution vertices with respect to the lower resolution ones, which may be performed entirely in the UV space (as opposed to the x, y and z axes of the 3D object's space), in some embodiments. As mentioned above, four resolutions may be used in the decoder 104, in some embodiments. For example, each of the four resolutions may be processed in a successive layer of the decoder 104, with each resolution's layer including graph convolution, followed by a vertex-wise fully connected (FC) layer, then followed by upsampling, in one embodiment.

Simulation systems are generally input sensitive, such that negligible differences in the input or initialization can result in substantial differences in the outputs, especially in the high frequency domain. Supervision on vertex positions tends to average those multiple possible outcomes, smoothing out its predictions. However, the high frequency content of a garment is important for garment perception and realism, since it is highly correlated to garment materials and tightness. Accordingly, it is beneficial for the system to inspect the spectral components of the garment mesh. In some embodiments, the system may apply the eigen decomposition on the Laplacian operator, such as:

$$L=UDU^{-1} \quad (3)$$

where L may be a mesh Laplacian, $U \in \mathbb{R}^{n*n}$ and D are the eigenvectors and the diagonal matrix of the eigenvalues. The subset of eigenvectors $V \in \mathbb{R}^{n*k}$ corresponding to the smallest k eigenvalues may be selected, in some embodiments. The spectral coefficients of a mesh $c=V^T x$ thereby represent the mesh components with lowest impact on Laplacian values. In one embodiment, such a method rejects the highest frequencies (typically noisy) since high frequency entails large local changes, which have a large impact in the Laplacian (and therefore large eigenvalues).

In some embodiments, the above spectral decomposition is implemented by introducing an MLP-based branch in the decoder network to account for residuals of the spectral components. For example, the system may output the coefficients $\Delta c$ of the 4,000 eigenvectors with the smallest eigenvalues, which have been found in experiments to be sufficient for reconstruction. These coefficients may then transferred back to the spatial domain $\Delta x=V\Delta c$ and added to the final result. The system may also introduce a spectral loss during training, as will be further discussed below along with other loss functions employed in the system. This spectral loss may ensure that high frequency components, which typically result in small vertex displacements, are given proper attention in the supervision of the model.

FIG. 2A depicts an illustrative data flow for a semi-supervised training or learning process that may be employed in some embodiments. The illustrative data flow may provide physics-enforced optimization of the model during training. For example, during inference on unseen input bodies, it is likely that the drape prediction does not reach a stable dynamical state because the corresponding potential energy may not be fully minimized in all cases. Further, in a virtual garment try-on application, the garment to be tried on virtually is often composed of materials different from the ones used in training. For example, a frontal graphic print of a T-shirt is usually stiffer and heavier than the rest of T-shirt. In theory such situations could be solved by training with the appropriate data. However, this is impractical given the large amount of commercial graphic prints, and impossible in the case of T-shirts or other garments with personalized prints (e.g., where a user may submit their own graphics or text to be printed on a T-shirt or other garment and requests an immediate dynamically rendered preview of how the garment would look when worn by the user).

To address the problems above, the system may optimize the trained models on specific samples at runtime. The network weights may be fine-tuned for each sample to minimize the potential loss of the garment, such as defined below:

$$\mathcal{L}_p = \mathcal{L}_g + \mathcal{L}_{st} + \mathcal{L}_b + \mathcal{L}_c \tag{4}$$

$$\mathcal{L}_g = \sum_{v \in \mathcal{M}} m(v) g^T x(v) \quad \mathcal{L}_{st} = \sum_{f \in \mathcal{M}} s(f) \quad \mathcal{L}_b = \sum_{e \in \mathcal{M}} B(e) \tag{5}$$

where $\mathcal{L}_p$, $\mathcal{L}_g$, $\mathcal{L}_{st}$, and $\mathcal{L}_b$ are the potential loss functions and its components: gravity, stretching, and bending energy, respectively, and $\mathcal{L}_c$ is a penetration loss function to make it collision-aware. $\mathcal{M}$ is the predicted mesh, $m(v)$, and $x(v)$ is the mass and coordinates of vertex v, $S(f)$ is the stretching energy of face f, and $B(e)$ is the bending energy of two adjacent faces with common edge e. In some embodiments, material stiffness coefficients may be multiplied to elements in the Green Strain of f and the curvature of e, respectively.

The proposed optimization discussed above may serve two purposes. First, it can be used to generate more training data in a semi-supervised way. By minimizing the potential energy of the prediction from a larger set of samples, the optimization creates new data that can be used again for training. Retraining the network with the new data can be regarded as semi-supervised learning since the training data has been produced by the previous network, turning the entire pipeline into a semi-supervised learning framework. Such a semi-supervised pipeline can greatly lower the burden of collecting ground-truth data from the time-consuming cloth simulation processes. As proven in experiments, the semi-supervised pipeline only requires 25% of the simulated data to obtain the same level of accuracy compared to purely supervised models. Also, it can generate better data in challenging cases with body self-intersection. Second, it can be adapted to materials that are not covered by the original model. The optimization allows the system to predict drapes where the garment contains graphic prints with different shapes and materials (as further discussed with respect to FIG. 2B). To achieve this, the system may be configured to minimize the potential loss of the new model containing the new graphic print.

Figure 2B:
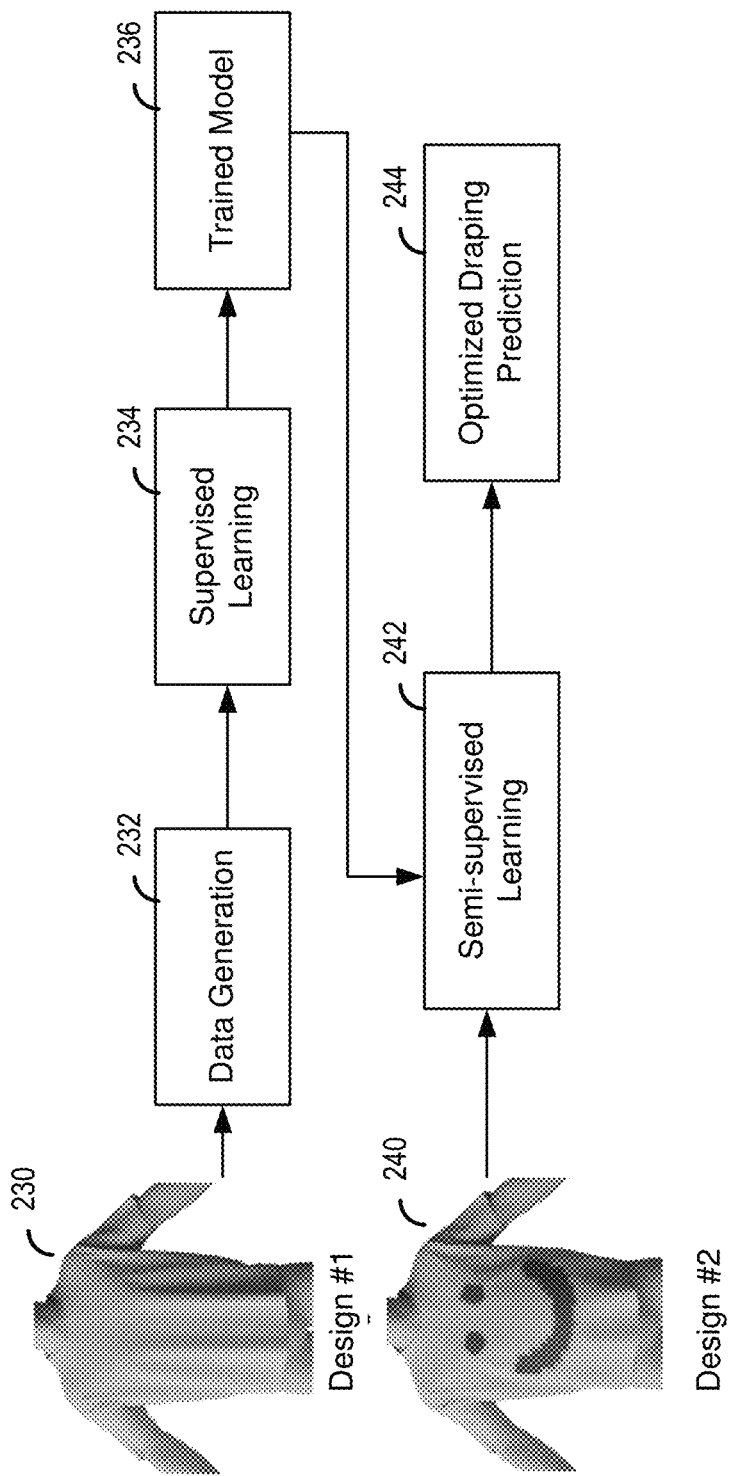
FIG. 2B provides another illustrative data flow of semi-supervised training methods employed in some embodiments.

The above features can be seen in the data flows of both FIGS. 2A and 2B. As shown in FIG. 2A, the initial simulation data 202 (such as the ground truth results of draping the garment on the training bodies using computationally slow simulation techniques) is provided to the network/model 204 (such as the framework including the encoder, spectral decoder and decoder in FIG. 1), which then provides a draping prediction/output 206, which is passed to the physics-inspired optimization 208 for producing refined training data 210. This refined data 210 based on the physics-inspired optimization may then be passed to the network/model 204 for further training without running additional computationally expensive cloth simulation methods. As discussed further herein, refining the initial output of the network/model 204 using physics-based or physics-inspired optimizations at 208 may include one or more of: considering design constraints associated with the garment, applying tailoring constraints, considering material properties or fabric properties of the garment, applying geometric constraints, considering physics associated with a material of the virtual garment (such as an extent to which the material stretches), and/or other considerations.

FIG. 2B provides another illustrative data flow of semi-supervised training methods employed in some embodiments. As shown in FIG. 2B, the semi-supervised approach described above and visually depicted in FIG. 2B allows the system to quickly adapt to a different distribution that includes previously unseen prints and/or materials using self-supervision based on physically-optimized data. This is a contrast to traditional methods, which typically would require preparing a new training dataset for new prints and/or materials, which is significantly more expensive with respect to both time and computing resources. By implementing a semi-supervised model training process on a canonical design, the system can quickly adapt to a new target distribution based on the physics enforced optimization process. Since such a method does not need to regenerate the ground truth data from the slow physics-based simulation again, it can achieve a much faster speed when adapting to a new design.

The above advantages can be seen in the data flow of FIG. 2B, where the first design of a shirt 230 (such as a shirt with no graphic print and including a single material, in this instance) is used in the initial training data generation 232. The initial data from data generation 232 is then provided to the supervised learning process 234 to lead to a trained model 236. For the trained model to then adapt to a new garment print and/or material (shown as design 240, which is the same shirt as 230 with the addition of a graphic print of a thicker material than the rest of the shirt), the semi-supervised learning process 242 is employed to produce the optimized draping prediction 244 without needing to return to a new data generation step (such as data generation 232).

Figure 3:
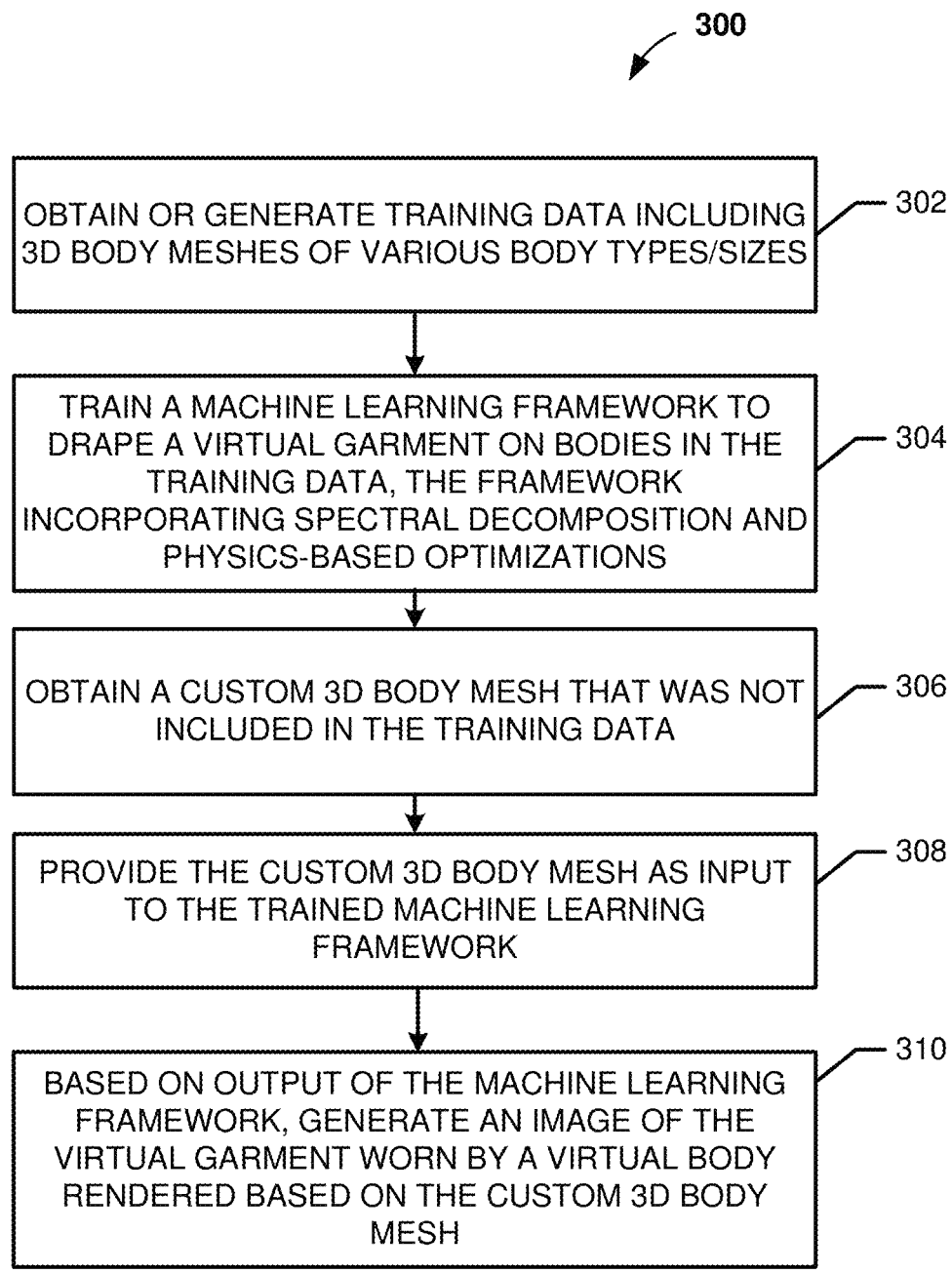
FIG. 3 is a flow diagram of an illustrative method for training and using a machine learning framework as described herein for virtually draping a garment on a 3D human body mesh.

FIG. 3 is a flow diagram of an illustrative method 300 for training and using a machine learning framework as described herein for virtually draping a garment on a 3D human body mesh. The method 300 may be implemented by one or more computing systems, such as computing system 502 that will be described below with respect to FIG. 5. In some embodiments, a computing system other than the system that trains the model may later utilize the trained model to generate renderings of clothed 3D human models. In other embodiments, the same computing system may train and later use the machine learning model or framework.

The method 300 begins at block 302, where the system 502 may obtain or generate training data including 3D body meshes of various body types/sizes. In some embodiments, the bodies may be generated using an SMPL model or other deformable 3D human body model using each of a wide variety of input parameters for the various body dimensions. For example, body shape parameters may be sampled following a uniform distribution in a body mass index (BMI) space with a range of 10 to 65 BMI. Depending on the desired use of the model (such as if the trained model will be used for a virtual try-on system where a single neutral body pose is sufficient), a single pose may be used for each body model. In one example, the system may generate 10,000-20,000 such human bodies as input training data.

In some embodiments, generating the training data may include, for each of the individual training bodies representing different human body sizes, both (a) generating a 3D mesh of the individual training body (such as using the SMPL model with varying input body parameters) and (b) generating a clothed version of the 3D mesh of the individual training body wearing the particular virtual clothing garment that the machine learning model is to be trained to drape. As discussed above, the clothed version may be used in training to represent the ground truth for training the machine learning model and may be generated using one or more physics-based cloth simulation techniques. One example of a suitable simulation method for generating the training ground truth is the ARCSim simulation engine (Adaptive Refining and Coarsening Simulator), though it will be appreciated that a variety of other known cloth or draping simulation techniques or engines may be used in other embodiments.

At block 304, the system may train a machine learning framework to drape the desired virtual garment on bodies in the training data. The training, including the associated semi-supervised aspects, have been discussed in detail above. As discussed above, the framework may be trained to incorporate spectral decomposition and physics-based optimizations. As explained in more detail above, according to some embodiments, the machine learning model includes (a) an encoder trained to extract body features from an input 3D mesh, and (b) a decoder network trained to drape the virtual clothing garment on the input 3D mesh based at least in part on spectral decomposition of a mesh associated with the virtual clothing garment. As further described above, training the machine learning model may include refining initial output of the machine learning model using one or more physics-based optimizations and feeding the refined initial output back to the machine learning model as additional training data.

At block 306, the system may obtain a custom 3D body mesh that was not included in the training data, such as a custom 3D body mesh for which draping prediction by the trained machine learning model is desired. In a virtual try-on system, the custom 3D body mesh may be a custom 3D body mesh representing a real body of a user that has indicated interest in purchasing a real garment represented by the virtual clothing garment. Any of a number of known techniques may be used to obtain or generate a 3D body mesh approximating the body appearance and/or measurements of a user's actual body. For example, body shape parameters for altering an SMPL model or other deformable human body model may be explicitly provided by the user (e.g., as numeric input of various body measurements that the user determined by measuring themselves with a tape measure), or may be obtained in an automated manner by the system through body scan data or images captured by a standard camera (such as a camera of a mobile phone). Some example techniques for estimating or extracting body parameters from images of a user are described, for example, in U.S. Pat. No. 9,189,886, titled "Method and Apparatus for Estimating Body Shape."

At block 308, the system may provide the custom 3D body mesh as input to the trained machine learning framework. Then, at block 310, the system may, based on output of the machine learning framework, generate an image of the virtual garment worn by a virtual body rendered based on the custom 3D body mesh. For example, the machine learning model may determine the positions of vertices of the 3D garment object when draped on the custom 3D model and render an image of the combined 3D body mesh with the 3D garment draped thereon from a predetermined virtual camera location (such as the body facing forward towards the virtual camera, though rendering of the side, back and other angles of the body and draped garment may alternatively or additionally be generated). In some embodiments, the output of the machine learning model prior to image generation may initially be a deformable 3D mesh of the garment, which the system may then combine with the body mesh for rendering as an image. In other embodiments, the output of the machine learning model may be a combined 3D mesh representing the body wearing the garment. The virtual clothing garment as rendered will typically include visible wrinkles that are determined by the machine learning model based at least in part on the custom 3D body mesh, such as a custom body mesh representing the real body of the user in a virtual try-on system. In the illustrated embodiment, the method 300 ends after block 310.

Multiple unique loss functions may be applied by the system, in some embodiments, to supervise and guide the machine learning model towards realistic outputs, as will be further described below. The loss functions may incorporate physical properties and/or reflect physical constraints. For example, the model output may be split into a correspondence point set and a displacement map:

$$x = c_x + d_x, y = c_y + d_y \qquad (6)$$

where c is the correspondence (closest) points on the body surface and d are the displacements with respect to the correspondence, and $*_x$ represents the prediction while $*_y$ represents the ground-truth. In some embodiments, both $c_x$ and $d_x$ are predicted separately from the network, while $c_y$ is obtained using closest point queries. This partition of garment into body plus displacement enables a direction loss that prevents intersections and preserves normals:

$$\mathcal{L}_{dir} = R\left(-\frac{n^T(c_x - c_x)}{\|c_x - c_y\|}\right) + \left(1 - \frac{(x - c_y)^T d_y}{\|x - c_y\| \|d_y\|}\right) \quad (7)$$

where R denotes relu, and n is the normal direction at $c_y$. The first part of the direction loss constrains the correspondence not to penetrate the body, while the second part constrains the direction of the prediction to be similar to the ground truth. Since $c_y$ is defined as the closest point on the body surface to the garment vertex x, minimizing the direction loss can help generate results with fewer intersections and better normal consistency.

In some embodiments, the system may use the per-vertex L1 difference of these two components separately to supervise the overall shape:

$$\mathcal{L}_{v2v} = \|c_x - c_y\|_1 + \|d_x - d_y\|_1 \quad (8)$$

Additionally, physics-inspired losses may be applied for the system to learn the correct deformation of the garment. The goal or purpose may be to transfer the physics constraints applied in simulation to geometric differences. In some embodiments, two aspects may be used to reflect the physics: edge lengths and deformation gradients. First, the edge loss measures the difference of the edge lengths relative to the ground truth:

$$\mathcal{L}_e = \frac{1}{|E|} \sum_{(u,v) \in E} \frac{|\|u_x - v_x\| - \|u_y - v_y\||}{\|u_y - v_y\|} \quad (9)$$

where $*_x$ are the predictions, $*_y$ are the ground-truths, and E is the edge set of the mesh. This loss may guide the model to generate more wrinkles because smoothed results often have smaller overall circumference (thereby larger edge loss) than ground-truths. Additionally, a loss may be defined that supervises the difference of the deformation gradient of each face in the mesh:

$$\mathcal{L}_d = \sum_{f \in \mathcal{M}} \|F_x(f) - F_y(f)\|_1 \quad F_x(f) = x(f)X^{-1}(f) \quad (10)$$

where F(f) is the deformation gradient of face f in the mesh $\mathcal{M}$, defined as the change of the world-space coordinates (x) per unit change of the material-space coordinates (X) within each triangle. This loss provides better alignment to the ground truth regarding the potential energy and the internal forces it generates. For example, the deformation gradient can represent the shear stress and bulk stress separately, while the edge-based loss cannot. To capture the curvature and higher frequency errors, a Laplacian Difference loss and a spectral loss may be defined, such as:

$$\mathcal{L}_l = \sum_{k=0}^{3} \|L_k(x - y)\|_1 \quad \mathcal{L}_s = \|V^T(x - y)\|_1 \quad (11)$$

where $L_k$ is the Laplacian operator on the mesh graph at the k-th resolution, and V are the eigenvectors of the Laplacian operator on the original mesh. The system may apply the Laplacian difference loss in different resolutions to account for wrinkles and folds of different sizes.

In some embodiments, the total loss may be determined by the system as the sum of the losses defined above (or a subset of them in other embodiments), such shown below. However, it will be appreciated that other loss functions may be use in addition to or instead of those described above, in other embodiments.

$$\mathcal{L} = \mathcal{L}_{v2v} + \mathcal{L}_{dir} + \mathcal{L}_e + \mathcal{L}_d + \mathcal{L}_l + \mathcal{L}_s \quad (12)$$

Figure 4:
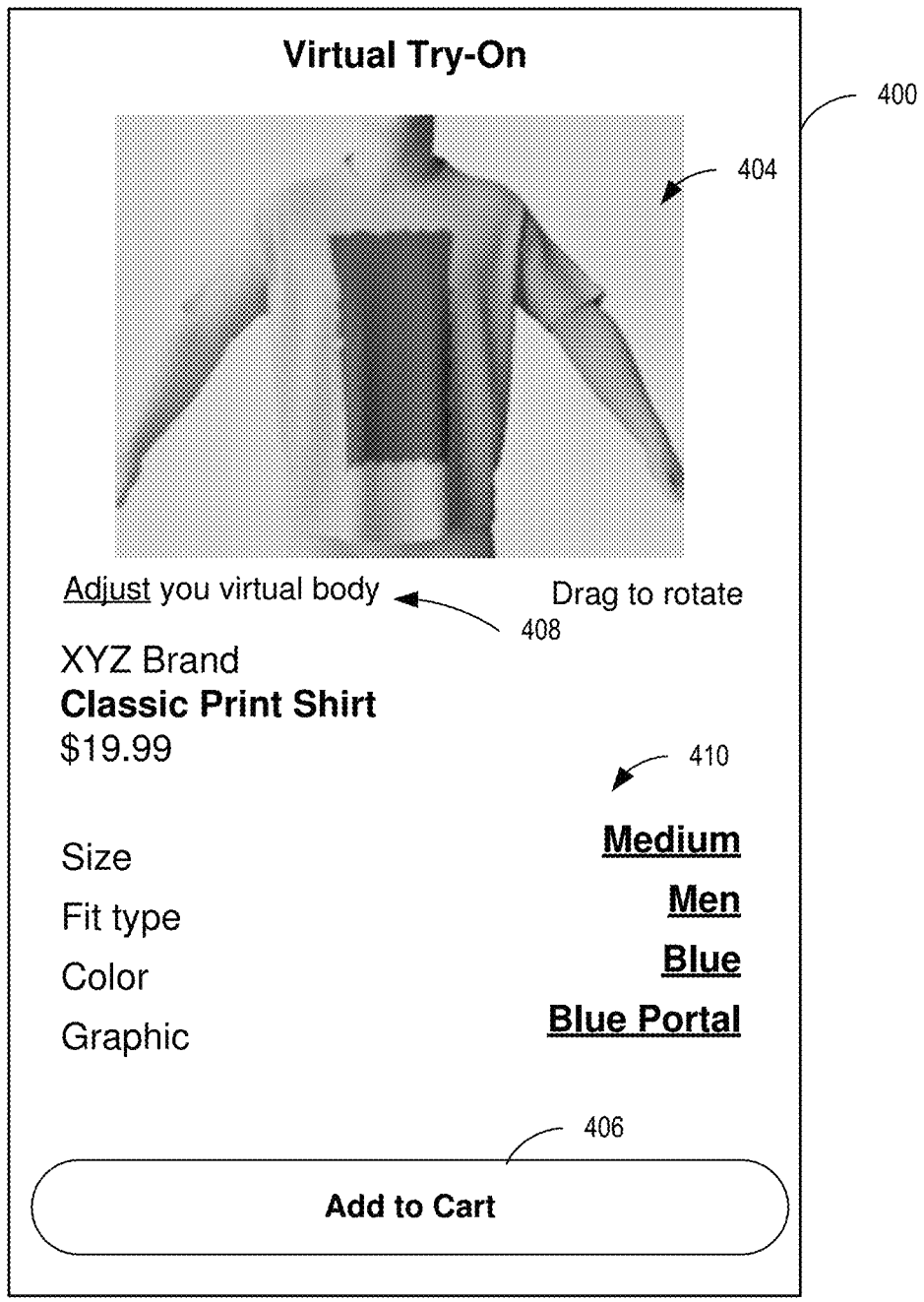
FIG. 4 is an illustrative user interface that may be generated for display on a user device to provide an interactive virtual try-on experience for a user.

FIG. 4 is an illustrative user interface 400 that may be generated by the computing system 502 and presented for display on a user device, such as user device 503, to provide an interactive virtual try-on experience for a user. For example, the user interface 400 may be generated by the computing system 502 for display via a browser application or other application operating on the user device 503, or alternatively may be generated at least in part by an application operating on the user device 503 based on a data and/or images received from the computing system 502 over a network, such as the Internet.

The user interface 400 may be presented, for example, to a user of an electronic commerce system who is interested in purchasing a particular shirt and has selected a shirt of potential interest in a previously presented user interface. The user interface 400 may be considered to provide an interactive virtual try-on experience for the user to view a rendered preview of how the selected shirt or other garment would look when worn by the user. The draped garment image 404 may be generated according to the machine learning framework and methods discussed above, by the computing system 502, based on a custom 3D body model that approximates or represents the actual body of the user (as previously discussed).

The user may select any of the options 410 to change aspects of the garment (such as size, fit type, color, and graphic, in the illustrated example) in order to see an updated preview of how the revised garment would appear on the user's virtual body. New data may be passed as input to the trained machine learning model to update the rendered garment preview or a different machine learning model may be applied, depending on the embodiment and which changes are selected by the user. For example, certain changes, such as garment size or fit type, may lead to the system selecting a different previously trained machine learning model that was trained for the revised garment. On the other hand, user selection of a different graphic (even a custom graphic uploaded or otherwise provided by the user as an image) to be printed on the shirt or other garment may be applied to the garment and the garment accurately draped using the same machine learning model trained on the original garment, as previously discussed.

In some embodiments, the user may select options or interact with the image 404 in order to see updated angles of the draped garment and body model. For example, in one embodiment, the user may drag (such as by touch on a touchscreen device or using a mouse) or otherwise make selections in association with the image 404 that cause the system to generate an updated preview of the garment as seen from behind the virtual body or from a side of the virtual body (e.g., for the user to see how the garment fits or lays on the virtual body from different views or angles). If the user feels that the given custom 3D body model does not accurately represent the user's actual body type or measurements, the user may select option 408 to be presented with options of adjust the body measurements or other details of the virtual 3D body (such as through explicit user entry of measurements or by the user device taking photographs of the user in particular poses from which body measurements may be determined by the system, as discussed above). If the user would like to proceed with purchasing the garment, they may select the option 406 to add the garment to an electronic shopping cart and/or initiate a checkout or purchase process.

Figure 5:
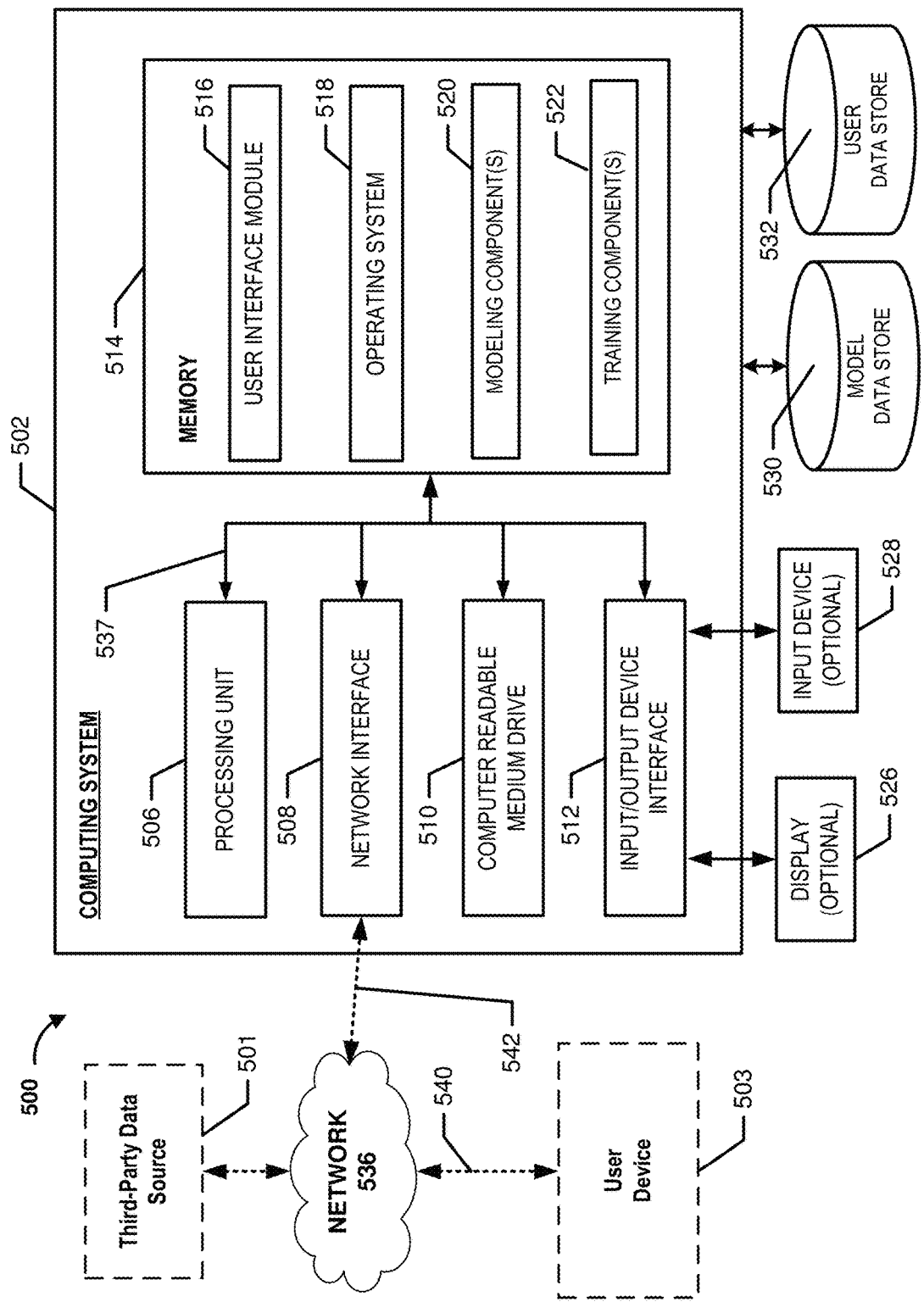
FIG. 5 illustrates a general architecture of a computing environment, according to some embodiments.

FIG. 5 illustrates a general architecture of a computing environment 500, according to some embodiments. As depicted in FIG. 5, the computing environment 500 may include a computing system 502. The general architecture of the computing system 502 may include an arrangement of computer hardware and software components used to implement aspects of the present disclosure. The computing system 502 may include many more (or fewer) elements than those shown in FIG. 5.

As illustrated, the computing system 502 includes a processing unit 506, a network interface 508, a computer readable medium drive 510, an input/output device interface 512, an optional display 526, and an optional input device 528, all of which may communicate with one another by way of a communication bus 537. The processing unit 506 may communicate to and from memory 514 and may provide output information for the optional display 526 via the input/output device interface 512. The input/output device interface 512 may also accept input from the optional input device 528, such as a keyboard, mouse, digital pen, microphone, touch screen, gesture recognition system, voice recognition system, or other input device known in the art.

The memory 514 may contain computer program instructions (grouped as modules or components in some embodiments) that the processing unit 506 may execute in order to implement one or more embodiments described herein. The memory 514 may generally include RAM, ROM and/or other persistent, auxiliary or non-transitory computer-readable media. The memory 514 may store an operating system 518 that provides computer program instructions for use by the processing unit 506 in the general administration and operation of the computing system 502. The memory 514 may further include computer program instructions and other information for implementing aspects of the present disclosure. For example, in one embodiment, the memory 514 may include a user interface module 516 that generates user interfaces (and/or instructions therefor) for display upon a computing system, e.g., via a navigation interface such as a browser or application installed on a user device 503.

In some embodiments, the memory 514 may include one or more modeling components 520 and model training components 522, which may be executed by the processing unit 506 to perform operations according to various embodiments described herein. The modules or components 520 and/or 522 may access the model data store 530 and/or user data store 532 in order to retrieve data described above and/or store data. For example, the model data store may store the trained models as well as training data and other model-related data described above. The user data store 532 may store user-specific body data (including custom 3D body meshes) and other data or information regarding individual users. The data stores 530 and/or 532 may be part of the computing system 502, remote from the computing system 502, and/or may be a network-based service. In other embodiments, the illustrated data stores or additional data stores may include garment data, item details regarding garments available for sale, and/or other data.

In some embodiments, the network interface 508 may provide connectivity to one or more networks or computing systems, and the processing unit 506 may receive information and instructions from other computing systems or services via one or more networks. In the example illustrated in FIG. 5, the network interface 508 may be in communication with a user device 503 via the network 536, such as the Internet. In particular, the computing system 502 may establish a communication link 542 with a network 536 (e.g., using known protocols) in order to send communications to the computing device 503 over the network 536. Similarly, the computing device 503 may send communications to the computing system 502 over the network 536 via a wired or wireless communication link 540. In some embodiments, the computing system 502 may additionally communicate via the network 536 with an optional third-party data source 501, which may be used by the computing system 502 to retrieve 3D body scan data, 3D mesh data, other 3D human model data, ground truth image or 3D data, various training data described above for an SMPL model, a fully trained SMPL model, and/or other data.

Those skilled in the art will recognize that the computing system 502 and user device 503 may be any of a number of computing systems or devices including, but not limited to, a laptop, a personal computer, a personal digital assistant (PDA), a hybrid PDA/mobile phone, a mobile phone, a smartphone, a wearable computing device, a digital media player, a tablet computer, a gaming console or controller, a kiosk, an augmented reality device, another wireless device, a set-top or other television box, one or more servers, and the like. The user device 503 may include similar hardware to that illustrated as being included in computing system 502, such as a display, processing unit, network interface, memory, operating system, etc.

Figure 6:
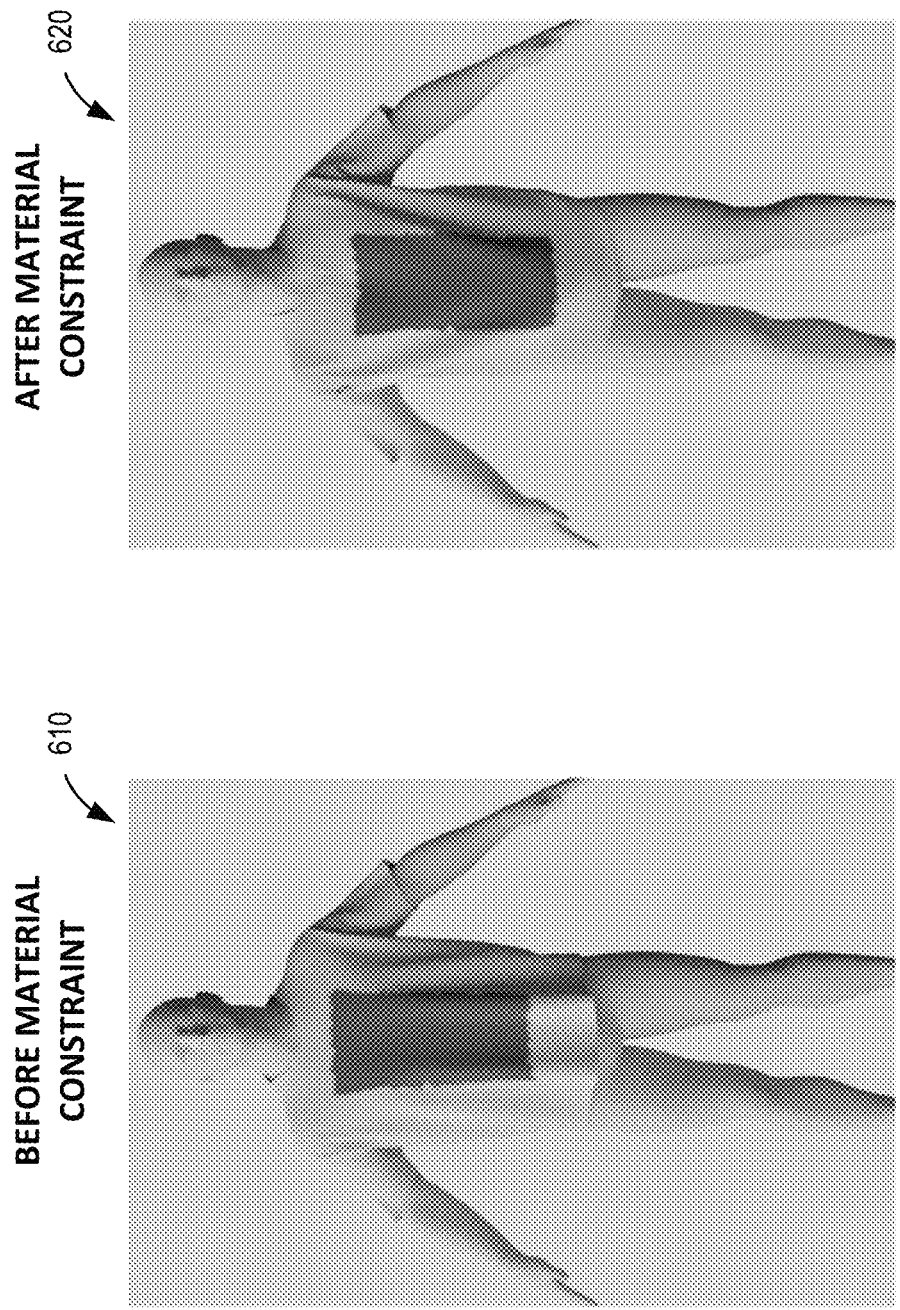
FIG. 6 illustrates example output of (1) a draped shirt before applying a material constraint for increased material thickness of a graphic print, and (2) the same shirt with material constraints described herein applied.

FIG. 6 illustrates example output of (1) a draped shirt 610 before applying a material constraint for increased material thickness of a graphic print, and (2) the same shirt 620 with material constraints described herein applied. As shown, the wrinkles and overall appearance of the shirt 610 do not appear to be affected by the graphic print on a portion of the shirt 610 (the blue rectangle on the front of the shirt), which is not particularly realistic given that typical graphic printing on cotton or other soft material results in thicker material or stiffer material properties in the portions of the garment that include the printing. On the other hand, the rendering of the shirt 620 with the material constraints applied appears more realistic, with the graphic print on the shirt causing the portion of the shirt with the print to appear stiffer. As discussed above, the appearance of heavier or stiffer graphics or other garment portions may be accomplished via physics-based optimizations at runtime.

FIG. 7 illustrates a comparison of sample output from the machine learning framework described herein, according to some embodiments, with sample output of a previously implemented neural network model. In this case, the prior model used to generate sample output 710B, 720B, 730B, 740B and 750B was TailorNet, as trained with the same data as the data used to train the embodiment of the present disclosure that generated output 710A, 720A, 730A, 740A and 750A. As can be seen in FIG. 7, the model and framework described herein produces better appearing results with respect to qualitative aspects such as global fold structures, normal consistency, fine wrinkle details and collision avoidance.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
    obtaining training data for a machine learning model to be trained to drape a virtual garment on a three-dimensional ("3D") body mesh, wherein the training data comprises, for each individual training body of a plurality of training bodies representing different human body sizes, (a) a 3D mesh of the individual training body and (b) a clothed version of the 3D mesh of the individual training body wearing the virtual garment;
    training the machine learning model to drape the virtual garment based on the training data, wherein the machine learning model comprises (1) an encoder trained to extract body features from an input 3D mesh, and (2) a decoder network trained to drape the virtual garment on the input 3D mesh based at least in part on spectral decomposition of a mesh associated with the virtual garment, wherein training the machine learning model includes refining initial output of the machine learning model using one or more physics-based optimizations that are based on physics associated with a material of the virtual garment;
    subsequent to training the machine learning model, obtaining a custom 3D body mesh that was not included in the training data;
    providing the custom 3D body mesh as input to the machine learning model; and
    based on output of the machine learning model, rendering an image of the virtual garment as worn by a virtual body rendered based on the custom 3D body mesh.

2. The computer-implemented method of claim 1, wherein the virtual garment as rendered includes visible wrinkles that are determined by the machine learning model based at least in part on the custom 3D body mesh.

3. The computer-implemented method of claim 1, further comprising generating the training data, wherein generating the training data comprises:
    obtaining body shape parameters representing each of a plurality of body types or sizes; and
    for each of the plurality of body types or sizes, generating a 3D mesh representing the body type or size at least in part by applying the corresponding body shape parameters to a deformable 3D human body model.

4. The computer-implemented method of claim 3, wherein the deformable 3D human body model comprises a Skinned Multi-Person Linear ("SMPL") model.

5. The computer-implemented method of claim 3, wherein the body shape parameters of the plurality of body types or sizes used in generating the training data follow a uniform distribution in a body mass index (BMI) space within a preset range of BMI.

6. The computer-implemented method of claim 1, further comprising:
    subsequent to training the machine learning model, implement a self-supervised learning process that modifies the trained machine learning model to drape a variation of the virtual garment without generating new ground truth training data.

7. The computer-implemented method of claim 6, wherein the variation of the virtual garment comprises a graphic print that alters a stiffness of a portion of material of the virtual garment where the graphic print appears.

8. The computer-implemented method of claim 7, wherein a material constraint implemented in the machine learning model as modified causes a rendered image of the variation of the virtual garment to appear stiffer in the portion of material of the virtual garment where the graphic print appears relative to an appearance of a corresponding portion of the virtual garment.

9. The computer-implemented method of claim 1, wherein the machine learning model is configured to drape multiple versions of the virtual garment having differently shaped graphics printed thereon without specifically training the machine learning model for each of the differently shaped graphics, wherein the differently shaped graphics cause differences in wrinkle dynamics between each of the multiple versions of the virtual garment.

10. The computer-implemented method of claim 1, further comprising:
generating a user interface comprising the image of the virtual garment as worn by the virtual body rendered based on the custom 3D body mesh, wherein the user interface is generated for display to a user that selected the custom 3D body mesh to be used in generating the image of the virtual garment.

11. The computer-implemented method of claim 10, wherein the user interface includes an option for the user to select or provide a graphic to be applied to the virtual garment, wherein selection of the option causes an updated image of the virtual garment as worn by the virtual body rendered based on the custom 3D body mesh, wherein the updated image is generated by the machine learning model without retraining the machine learning model, wherein the graphic affects wrinkle dynamics of the virtual garment as depicted in the updated image.

12. A system comprising:
a non-transitory data store; and
at least one computing device configured with computer-executable instructions that, when executed, cause the at least one computing device to:
obtain training data for a machine learning model to be trained to drape a virtual garment on a three-dimensional ("3D") body mesh, wherein the training data comprises, for each individual training body of a plurality of training bodies representing different human body sizes, (a) a 3D mesh of the individual training body and (b) a clothed version of the 3D mesh of the individual training body wearing the virtual garment;
train the machine learning model to drape the virtual garment based on the training data, wherein the machine learning model comprises (1) an encoder trained to extract body features from an input 3D mesh, and (2) a decoder network trained to drape the virtual garment on the input 3D mesh based at least in part on spectral decomposition of a mesh associated with the virtual garment, wherein training the machine learning model includes refining initial output of the machine learning model using one or more physics-based optimizations that are based on physics associated with a material of the virtual garment;
obtain a custom 3D body mesh that was not included in the training data;
provide the custom 3D body mesh as input to the machine learning model; and
based at least in part on output of the machine learning model, generate 3D data representing the virtual garment as worn by a virtual body rendered based on the custom 3D body mesh.

13. The system of claim 12, wherein the encoder comprises a neural network, and wherein the decoder network includes (a) a decoder comprising a graph convolutional network and (b) a spectral decoder comprising a neural network.

14. The system of claim 12, wherein the custom 3D body mesh is generated based at least in part of body parameters representing an actual body of a user, wherein the virtual garment as worn by the virtual body rendered based on the custom 3D body mesh represents how a physical version of the virtual garment would appear when worn by the user.

15. The system of claim 12, wherein the at least one computing device is further configured to:
generate a user interface for display, wherein the user interface includes a rendered image of the 3D data representing the virtual garment as worn by the virtual body, wherein the user interface further includes one or more options that, when selected by a user, cause additional views of the 3D data representing the virtual garment as worn by the virtual body to be rendered for display, wherein the additional views comprise at least one of (a) rotating the virtual body or (b) moving a position of a virtual camera relative to the virtual body.

16. The system of claim 12, wherein the computer-executable instructions causing the at least one computing device to refine the initial output of the machine learning model using the one or more physics-based optimizations further comprises the computer-executable instructions causing the at least one computing device to at least one of (a) apply tailoring constraints, (b) consider material properties or fabric properties, or (c) apply geometric constraints.

17. A non-transitory computer readable medium including computer-executable instructions that, when executed by a computing system, cause the computing system to at least:
obtain training data for a machine learning model to be trained to drape a virtual garment on a three-dimensional ("3D") body mesh, wherein the training data comprises, for each individual training body of a plurality of training bodies representing different human body sizes, (a) a 3D mesh of the individual training body and (b) a clothed version of the 3D mesh of the individual training body wearing the virtual garment;
train the machine learning model to drape the virtual garment based on the training data, wherein the machine learning model comprises (1) an encoder trained to extract body features from an input 3D mesh, and (2) a decoder network trained to drape the virtual garment on the input 3D mesh based at least in part on spectral decomposition of a mesh associated with the virtual garment, wherein training the machine learning model includes refining initial output of the machine learning model using one or more physics-based optimizations;
subsequent to training the machine learning model, implement a self-supervised learning process that modifies the trained machine learning model to drape a variation of the virtual garment without generating new ground truth training data;
obtain a custom 3D body mesh that was not included in the training data;
provide the custom 3D body mesh as input to the machine learning model; and
based at least in part on output of the machine learning model, generate 3D data representing the virtual garment as worn by a virtual body rendered based on the custom 3D body mesh.

* * * * *